Patented June 10, 1941

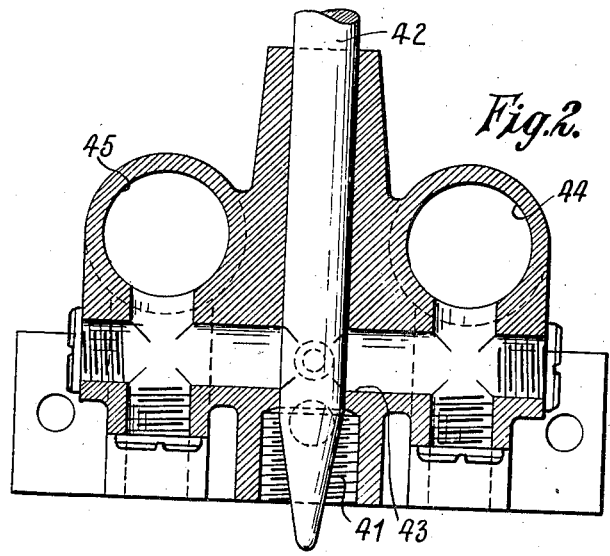
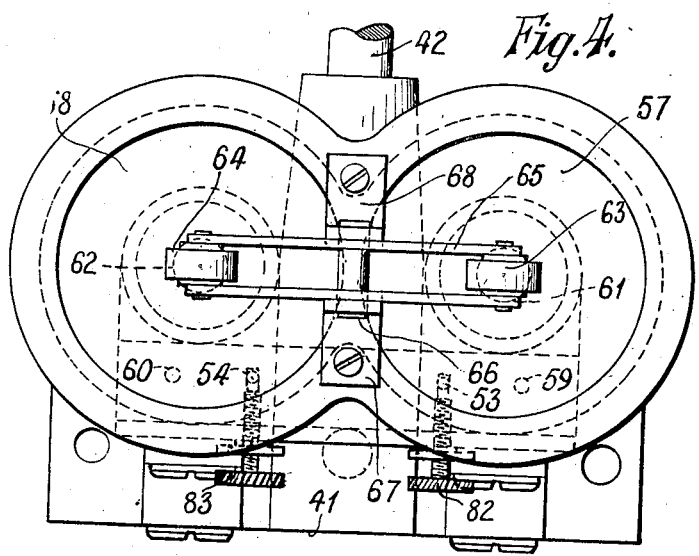

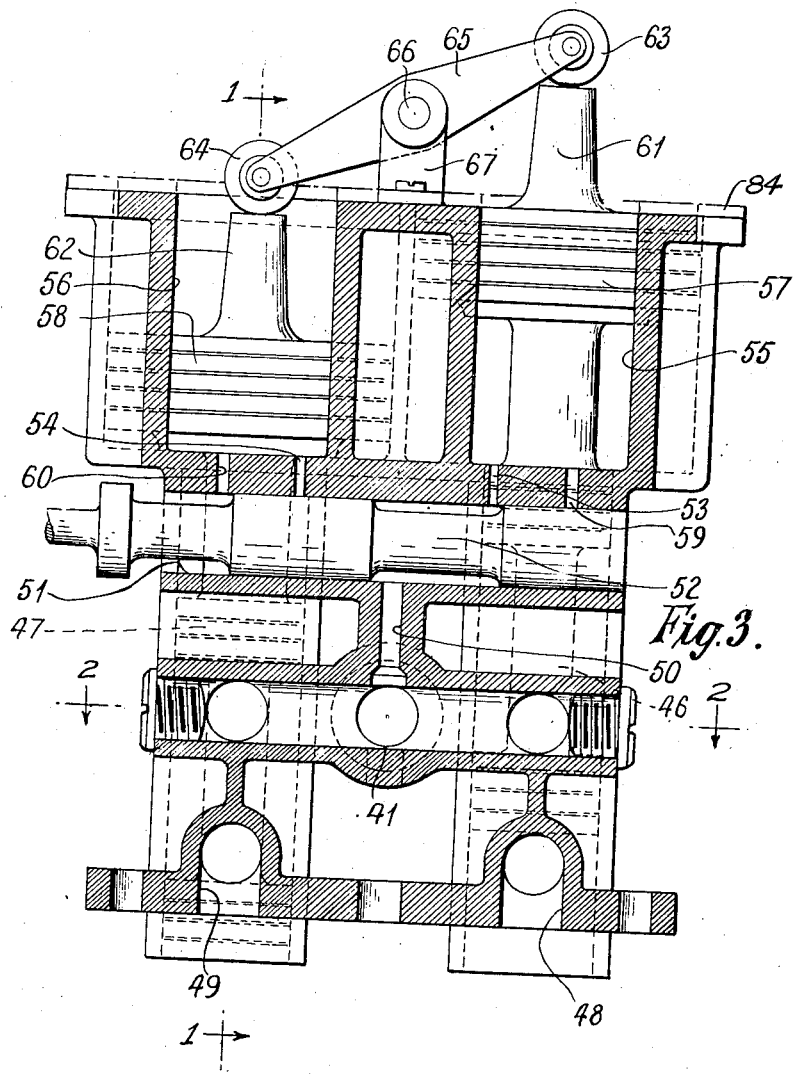

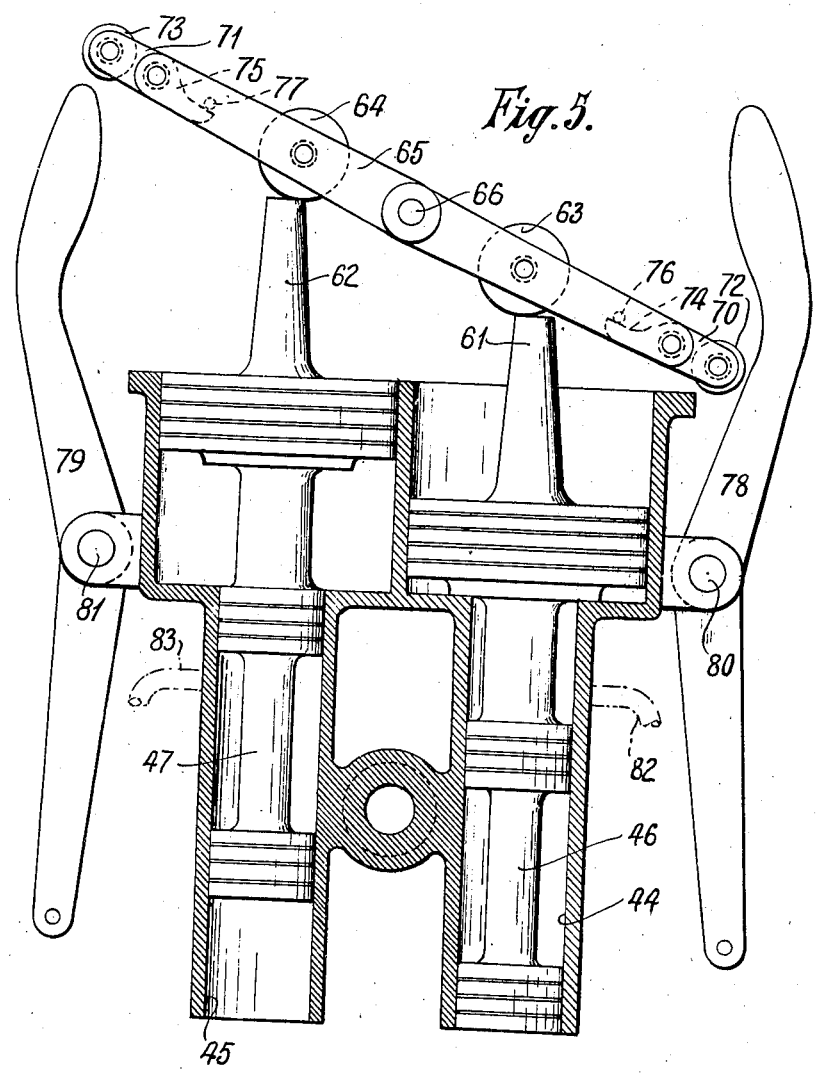

2,245,011

UNITED STATES PATENT OFFICE 2,245,011

CONTROL APPARATUS FOR HYDRAULIC SYSTEMS

John Hughes Rice, Port Eynon, near Swansea, England, assignor to Rimer Manufacturing Co. Ltd.

Application August 29, 1939, Serial No. 292,513
In Great Britain September 2, 1938

8 Claims. (Cl. 121—157)

This invention relates to control apparatus for hydraulic systems and has for its object to provide improved valve distributing gear ensuring a positive response to the gear irrespective of the rate of actuation of the control member.

The valve distributing gear according to the invention comprises essentially piston valves slidable in cylinders and controlling the admission of the pressure medium to the hydraulic apparatus, pistons adapted to be loaded with the pressure medium and to position the piston valves, and a pilot valve controlling the loading of the pistons by the pressure medium.

This valve distributing gear according to the invention is well adapted for use in electro-hydraulic systems in which a constant delivery oil pump is driven by means of an electric motor and thereby serves for converting the relatively high speed of rotation of the electric motor into a reciprocation of any desired speed, the actual speed of reciprocation advantageously being controlled by means of a needle valve associated with the pressure medium inlet to the distributing gear.

In order that the invention may be more readily understood reference will now be made to the accompanying drawings in which—

Fig. 2 is a sectional view taken on line 2—2 of Fig. 3,

Fig. 3 is a sectional view taken on line 3—3 of Fig. 1,

Fig. 4 is a plan view of the device of Fig. 3,

Fig. 5 shows a modification in section through the cylinders accommodating the piston valves.

Figure 1:
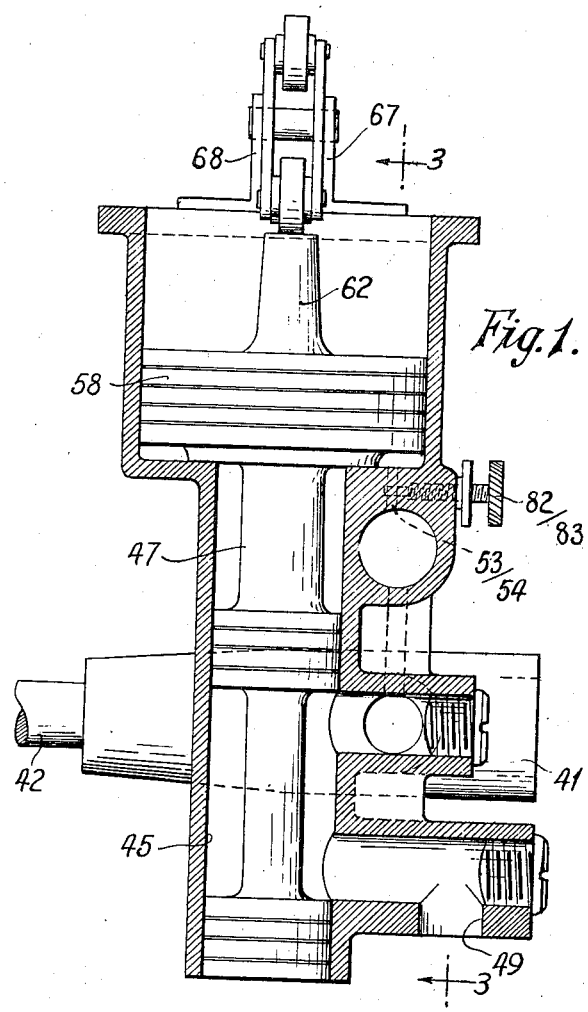
Fig. 1 shows the valve distributing gear in section along line 1—1 of Fig. 3.

The pressure connection from the pump is connected to the valve housing at 41 and the rate of flow of the oil or other pressure medium is controlled by means of the needle valve 42, which is shown in the fully closed position in Fig. 2. From the inlet 41 the oil passes to the transverse conduit 43, which communicates with two parallel cylinders 44 and 45 in which piston valves 46 and 47 are accommodated. The cylinders 44 and 45 have outlets 48 and 49 respectively. When the piston valves are in their lowermost position, as is the case for example for the piston valve 47 in Fig. 3, the pressure medium can pass through the cylinder 45 to the pressure outlet 49. As can be seen from Fig. 3 where the piston valve 46 is in its uppermost position, the lower piston then forms a seal preventing the pressure medium from passing from the channel 43 through the cylinder 44 to the outlet 48.

Also communicating with the channel 43 by way of a passage 50 is a pilot cylinder 51 accommodating a pilot piston valve 52. In Fig. 3 the pilot piston valve 52 is shown in its right-hand end position, in which communication is established through a channel 53 to cylinder 55 in which operates a piston 57 carried on an extension of the piston valve 46. In the setting shown in Fig. 3 the pressure medium is applied to the underside of the piston 57 so that the piston valve 46 is maintained in the position shown in which the pressure medium is cut off from the pressure outlet 48. In this position in the corresponding cylinder 45 the piston valve 47 is in its lowermost position and the space in the cylinder 56 below the piston 58 is in free communication with the space surrounding the valve mechanism by way of the outlet channel 60. Thus pressure medium passes through the outlet 49 to the hydraulically actuated apparatus controlled by the valve mechanism, while the medium returning from the apparatus passes through 48 into the open lower part of the cylinder 44 and from thence is discharged, as described in my co-pending application Serial No. 292,512, filed August 29, 1939.

When the pilot valve 52 is moved from the position shown in Fig. 3 to the other corresponding end position, the channels 53 and 60 are first closed so that the spaces in both cylinders 55 and 56 below the pistons 57 and 58 respectively are completely isolated. In the further travel of the pilot valve 52 the channel 59 is exposed so that the medium in the cylinder 55 below the piston 57 can escape and the piston valve 46 is free to move downwardly. Also the channel 54 leading to the cylinder 56 below the piston 58 is placed in communication with the channel 59 so that pressure medium is introduced into the cylinder 56 and the piston 58 and with it the piston valve 47 is urged upwardly. Thus the reversal of the hydraulically actuated apparatus does not occur until the positions of the two piston valves 46, 47 have been reversed. If the distributing valve gear is so arranged that Fig. 3 can be regarded as a vertical elevation in partial section, then gravity can be relied upon to restore the piston valves from their uppermost position to their lowermost position. It may however be preferable to have a positive return movement and for that purpose the mechanism now to be described is provided in the embodiment illustrated. Secured to the surface of the housing between the free ends of the cylinders 55 and 56 are two brackets 67, 68 carrying a pivot pin 66 on which is mounted a rocker 65 the ends of which carry rollers 63, 64. The stems of the piston valves 46, 47 are provided with extensions 61, 62 which contact with the rollers 63, 64 so that when one of the piston valves 46, 47 is moved by the admission of pressure medium beneath the corresponding piston 57 or 58 the other is positively constrained to move in the other direction. It is then no longer essential for the valve mechanism to be mounted to operate with the piston valves 46, 47 moving vertically. Whether or not the rocker mechanism is provided, the upward movement of the pistons 57, 58 can be limited by a cover plate, indicated at 84 in Fig. 3.

The time period occupied by reversal of the piston valves 46, 47 is primarily established by the relation between the volumetric content of the cylinders 55, 56, and the area of the channels 53, 54, and 59, 60. If so required, the time period can be varied by adjustment of needle valves 82, 83, varying the flow of the pressure medium through the channels 53, 54.

The arrangement shown in Fig. 5 has a modified rocker gearing in comparison with that previously described with reference to Figs. 1 and 2. Insofar as Fig. 5 shows the same components as those of the previous construction the same reference numerals are employed and no further description is necessary.

In Fig. 5 the rocker arm 65 extends beyond the rollers 63 and 64 and pivoted to the ends are extension levers 70, 71 carrying rollers 72, 73 at their free ends. These extension levers have inwardly directed portions 74, 75 which are spring-urged into contact with stop pins 76, 77 carried by the rocker arm.

Pivoted to the housing of the valve mechanism at 80, 81 are two double armed levers 78, 79, the upper ends of which are constructed as cams adapted to co-operate with the rollers 72, 73. When by the displacement of the pilot vlave, as described with reference to Figs. 1 to 4, the piston valves 46, 47 are caused to move from the position shown in Fig. 5 to a position corresponding to that in Fig. 3, the roller 72 will cause the lever 78 to be displaced outwardly, whereas the arm 71 carrying the roller 73 will be caused to turn about its pivot by contact with the upper end of the lever 79 so that the latter lever will not be displaced in this movement of the rocker arm. Similarly in the movement of the rocker arm in the other direction the lever 79 will be actuated but not the lever 78. The movement of the lever arms 78 and 79 in timed relationship to the movement of the piston valves 46 and 47 can be utilised to control the valves of pumps and similar hydraulically actuated mechanisms operated by a piston, controlled by the valve distributing gear according to the present application. Instead of the purely mechanical control derived from the movement of the rocker arm an equivalent control could be derived from the pressure medium by providing connections 82, 83 in the upper parts of the cylinders 44, 45. In this way the change in pressure caused by the displacement of the piston valves from the lowermost positions to the uppermost positions can be utilised.

I claim:

1. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, and a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening.

2. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, and a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening, said pilot valve comprising a cylinder and a reciprocating piston, the axis of which lies in a plane perpendicular to the plane of the axes of the parallel cylinders.

3. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening, and means mechanically linking the piston valves, whereby movement of one piston valve in one direction will cause the other piston valve to move in the opposite direction.

4. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening, extensions carried by the ends of the piston valves, and a rocker arm mounted on the cylinders and having each end engaging the extensions.

5. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening, extensions carried by the ends of the piston valves, a rocker arm mounted on the cylinder and having each end engaging the extensions, extensions carried by the rocker arm, and control levers mounted on the cylinders and having portions thereof in the path of travel of the rocker arm extensions for actuation of said levers.

6. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening, and auxiliary control ports provided in said parallel cylinder and adapted to be placed in communication with said supply ports by the movement of the piston valves.

7. A fluid pressure actuated device comprising two parallel cylinders each having a pressure medium supply port, placing said cylinder in constant communication with a supply of pressure medium, and an exhaust opening, a separate piston valve slidably mounted in each cylinder, each cylinder having a port controlled by the piston valve in said cylinder for placing said last-recited port in communication with the medium supply port or with the exhaust opening, an actuating cylinder and piston associated with each piston valve for actuating the latter, each actuating cylinder having an inlet and discharge port, a pilot valve for controlling the ports of the actuating cylinders to alternately connect said ports with the pressure medium supply and to exhaust, whereby the piston valves will be alternately displaced to cause fluid to flow from the pressure medium supply port to the valve controlled port and from the valve controlled port to the exhaust opening, and a needle valve controlling the flow of pressure medium to said distributing valve gear.

8. A fluid pressure actuated device comprising two parallel cylinders each having a pressure medium supply port, placing said cylinder in constant communication with a supply of pressure medium, and an exhaust opening, each of said cylinders having an axial extension of enlarged diameter, a separate piston valve in each cylinder, each piston valve comprising a stem, a pair of axially spaced pistons at one end of the stem and mounted in said cylinder and an enlarged piston on the other end of the stem mounted in the cylinder extension of enlarged diameter, each cylinder having a port controlled by the piston valve and adapted to be placed alternately in communication with the supply port and the exhaust opening, the extension of each cylinder having a pressure medium intake port for the supply of pressure medium thereto for displacing the enlarged piston and the piston valve associated therewith and a discharge port for the release of pressure medium therefrom, means interconnecting the piston valves, and a pilot valve for controlling the supply and discharge of pressure medium to and from said cylinder extensions.

JOHN HUGHES RICE.